United States Patent Office 3,457,590
Patented July 29, 1969

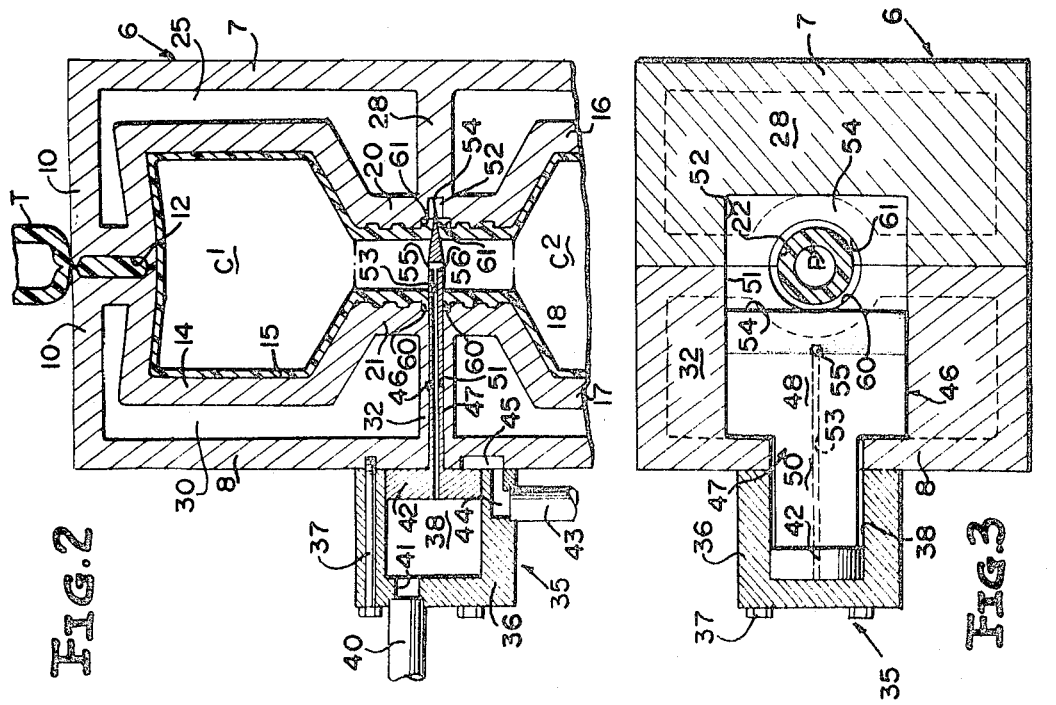
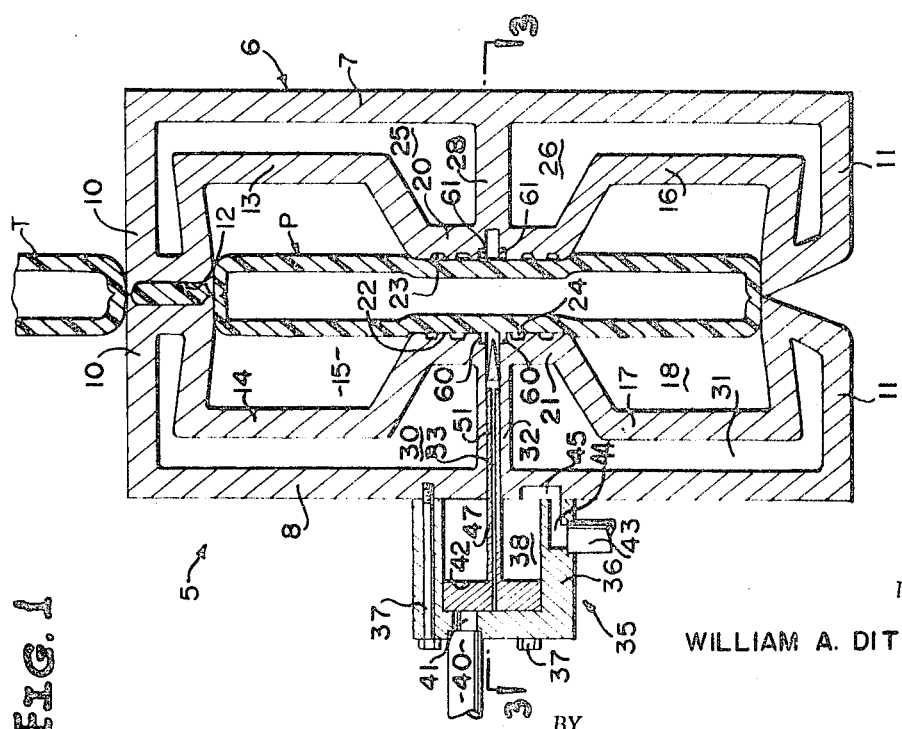

3,457,590
TANDEM BLOW MOLDING APPARATUS
William A Dittmann, Dolton, Ill., assignor to Continental Can Company, Inc., New York, N.Y., a corporation of New York
Filed Oct. 20, 1965, Ser. No. 498,416
Int. Cl. B29c 1/00, 17/04; B26d 7/08
U.S. Cl. 18—5                 9 Claims

ABSTRACT OF THE DISCLOSURE

This disclosure relates to a novel apparatus for blow molding a plurality of hollow plastic articles from a tube of plastic material extruded into a tandem mold cavity, and in particular, to novel means for severing the tube while the same is in the mold cavity to form a plurality of tube sections therefrom and blowing an article from each section by introducing pressurized fluid into each section by the same means which form the sections from the plastic tube.

---

Tandem molds are known which have a plurality of cavities in each of which is simultaneously blown a hollow article, such as a container or other hollow object, by extruding and introducing a hot plastic tube between sections of the tandem mold and closing the mold to pinch-off opposite ends of the tube. A blow needle is then inserted through the clamped off tube section between the cavities and pressurized air is introduced through the blow needle into the interior of the clamped off tube section to inflate the section of the configuration of the mold cavities, thereby simultaneously blowing a hollow article in each cavity of the tandem mold.

When it is desired to blow bottles or similar containers in a tandem mold, the mold is generally provided with axially aligned body cavities joined together by a central neck cavity. A tube of hot plastic material is extruded between the open halves of the tandem mold. When the mold is closed a section of the tube is isolated and pinched off, but not secured at each end of the mold. A blow needle at the location of the central neck cavity is introduced through the clamped off section of the tube and pressurized air introduced into the interior of the clamped off tube section inflates the section to the configuration of the mold cavities to form a container in each joined at the neck portions thereof. The blow needle is withdrawn, the tandem mold opened and the tandem blown containers removed. After the containers have been removed, they are separated by severing or cutting a section of the plastic material in the area of the container necks. The removed material forms no part of either of the tandem blown containers, and is waste material which is discarded.

After the conventionally blow molded containers have been separated, it is generally necessary to perform several operations to finish the containers. For example, the severing operation may be followed by a reaming operation by which the necks of the containers are reamed out in a conventional manner, and the lip or rim of each container is faced off to a smooth and flat finish.

An object of this invention is to provide a novel tandem mold for making hollow plastic articles from a plastic tube of extruded material including a mold cavity defining a plurality of article forming cavity portions, means for severing a plastic tube received in the mold cavity and means for separating the plastic tube in the cavity into spaced apart tube sections whereby separate unconnected hollow articles are formed upon the expanding of the sections into contact with the cavity portions by the introduction of pressurized fluid into the tube.

A further object of this invention is to provide novel apparatus for making a plurality of hollow separate plastic articles from sectioned separate portions of a plastic tube comprising a sectional mold having first and second article defining cavities joined by an intermediate cavity portion, means for introducing a tube of plastic material into both the cavities and the intermediate cavity portion, means for transversely separating the tube into at least two spaced unconnected sections after the sectional mold has been closed, and means for expanding both tube sections by introducing pressurized fluid into the spaced sections by a common means whereby the sections are expanded into contact with the cavities to form a plurality of unconnected articles.

A further object of this invention is to provide a novel apparatus of the character immediately above set forth in which the separating means includes blade means movable across the intermediate cavity portion to transversely separate the tube into the sections by a severing operation, and the expanding means includes means forming a portion of the blade means for establishing a path of fluid communication through the blade means into each of the cavities.

A further object of this invention is to provide a novel apparatus for making a plurality of hollow separate unconnected plastic articles from sectioned separate portions of a hot plastic tube comprising a sectional mold having first and second article defining cavities joined by an intermediate cavity portion, means for introducing a tube of plastic material into both of the cavities and the intermediate cavity portion, blade means for separating the tube into at least two spaced unconnected tube sections after the sectional mold is closed, means for expanding both tube sections by introducing pressurized fluid into the spaced sections, means for supporting the tube internally thereof against inward collapsing during the severing of the tube into the tube sections and means for accommodating tube material displaced during the severing of the tube into the tube sections.

With the above, and other objects in view that will hereinaftert appear, the nature of the invention will be more clearly understood by reference to the following detailed description, the appended claims and the several views illustrated in the accompanying drawing.

In the drawing:

FIGURE 1 is a longitudinal sectional view of a novel tandem blow mold constructed in accordance with this invention and illustrates a pinched off portion of a hot plastic tube in the mold and the position of a blade prior to being reciprocated to sever the tube portion to form two separate unconnected tube sections.

FIGURE 2 is a fragmentary longitudinal sectional view of the mold of FIGURE 1, and illustrates the position of the blade at the completion of the severing operation and the separate sections expanded to the configuration of mold cavities by the introduction of air pressure into the sections through the blade.

FIGURE 3 is a transverse sectional view of the tandem blow mold taken along line 3—3 of FIGURE 1, and more clearly illustrates the construction of the blade.

An apparatus constructed in accordance with this invention is best illustrated in FIGURE 1 of the drawing and is generally designated by the reference numeral 5. The apparatus 5 comprises a sectional tandem blow mold 6 having mold bodies or sections 7 and 8 which have upper and lower ends 10, 11 respectively .The mold sections 7 and 8 can be conventionally hinged together (not shown) or conventionally reciprocally mounted (also not shown) for movement from an open position (not shown) to the closed position shown in the drawing.

A tube T of hot plastic material is extruded downwardly as viewed in FIGURE 1 of the drawing from a conventional extrusion machine (not shown) between the mold sections 7 and 8 when these sections are in the open position thereof. The mold sections 7 and 8 are then closed and a portion P of the plastic tube T is pinched off between the upper ends 10 of the mold sections 7 and 8 which are cooperatively relieved to define a flash cavity 12 which receives the material of the tube T which is displaced when the mold sections 7 and 8 are closed.

A wall portion 13 of the mold section 7 opposes a wall portion 14 of the mold section 8 to define therebetween a mold cavity 15 contoured to the general configuration of an inverted container or bottle. A wall portion 16 of the mold section 7 similarly opposes a wall portion 17 of the mold section 8 to similarly define therebetween a mold cavity 18 contoured to the general configuration of an upright container or bottle. The wall portions 13 and 16 of the mold section 7 are joined together by an intergral wall portion 20 opposing a similar wall portion 21 joining the wall portions 14 and 17 of the mold section 8. The wall portions 20 and 21 define therebetween an intermediate neck cavity 22 (FIGURE 3). The wall portions 20 and 21 of the neck cavity 22 are respectively grooved at 23 and 24. The grooving 23 and 24 forms exterior threads on the necks of containers blow molded in the tandem blow mold 6 in a manner to be described more fully hereafter.

Chambers 25 and 26 of the mold section or body 7 are separated by a generally horizontal wall portion 28 while substantially identical chambers 30 and 31 of the mold body 8 are similarly separated by a wall portion 32 in planar alignment with the wall portion 28, as is best illustrated in FIGURE 1 of the drawing. The chambers 25, 26, 30 and 31 are cooling chambers into which a cooling medium is continually introduced circulated and withdrawn during a blow molding operation, as will be described fully hereinafter.

Prior to expanding the pinched off portion P a severing mechanism 35 of the apparatus 5 is actuated to cut the pinched off portion P into two separate unconnected sections. The severing mechanism 35 comprises a housing or air cylinder 36 secured to the mold body 8 by a plurality of identical bolts 37. Fluid under pressure, such as compressed air, is introduced into a chamber 38 of the housing 37 through a conduit 40 and a port 41 (FIGURES 1 and 2) to urge a reciprocal piston 42 from the position shown in FIGURE 1 to the position shown in FIGURE 2. A similar conduit 43, a port 44 in the housing 36 and a port 45 in the mold body 8 urge the piston 42 from the position shown in FIGURE 2 to the position shown in FIGURE 1. During the movement of the piston 42 from left-to-right as viewed in the drawing air is vented from the chamber 38 in a conventional manner through the ports 45, 44 and the conduit 43 while movement of the piston 42 from right-to-left is similarly accompanied by a venting of the chamber 38 through the port 41 and the conduit 40.

The piston 42 forms a portion of a blade means 46 which both severs and separates the pinched off portion P of the tube T and introduces pressurized air into the severed sections during a blowing cycle of the apparatus 5.

The blade means 46 comprises a substantially T-shaped blade or blade member 47 having a substantially rectangular main body portion 48 and a narrower base portion 50 (FIGURE 3) integrally joined to the piston 42. The main body portion 48 of the blade 47 is received in and guided by a slot 51 formed in the wall portions 32 and 21 of the mold body 8. The slot 51 mates with a slot or recess 52 formed in the wall portion 20 of the mold body 7. The slots 51 and 52 cooperate with each other and with the main body portion 48 of the blade 47 in a manner clearly illustrated in FIGURE 3 of the drawing to guide the blade 47 and the reciprocation thereof between the positions illustrated in FIGURES 1 and 2 of the drawing.

A longitudinal passage 53 is formed in the blade 47 and terminates adjacent a tapered sharpened edge 54 thereof in oppositely directed ports 55 and 56 opening through the main body portion 48 toward the respective cavities 15 and 18. The passage 53 and the ports 55 and 56 establish a path of fluid communication into the pinched off portion P of the tube T from the chamber 38 of the severing means 35 in a manner clearly illustrated in FIGURE 2 of the drawing.

After the portion P of the hot plastic tube T has been pinched off by the closing of the mold body 7 and 8 in the manner illustrated in FIGURE 1 of the drawing, air under pressure from a conventional source is introduced into the chamber 38 through the conduit 40 and the port 41 to rapidly drive the piston from the position illustrated in FIGURE 1 to the position shown in FIGURE 2 whereupon the sharp edge 54 of the blade 47 completely severs the portion P to form two axially separate unconnected tube sections above and below the main body portion 48 of the blade 47. Both sections of the pinched off portion P are then simultaneously expanded into contact with the interior surfaces (unnumbered) of the cavities 15, 18 and 22 by the pressurized air passing from the chamber 38 through the passage 53 and the oppositely opening ports 55 and 56 opening into the respective upper and lower sections to expand the same into the respective hollow articles or container C¹ and C² of FIGURE 2. After the sections have been expanded or blown to form the articles C¹ and C² the piston 42 and the blade 47 carried thereby is returned to the position illustrated in FIGURE 1 of the drawing by introducing air under pressure into the chamber 38 through the conduit 43 and the ports 44 and 45. This withdrawal of the blade means 46 after severing and separating the pinched off tube portion P and expanding the same is preferably performed after cooling medium has been introduced in the chambers 25, 26, 30 and 31 to set the containers C¹ and C². This assures the separation of the blow containers C¹ and C² after the withdrawal of the blade means 46 from the position shown in FIGURE 2 and the opening of the mold bodies 7 and 8.

During the cutting of the pinched off portion P into two separate unconnected sections in the manner heretofore described, the pinched off portion P is preferably supported in two distinct ways to prevent internal collapsing of the wall thereof as the same is severed or cut by the edge 54 of the blade means 46. During the extrusion of the plastic tube T by the conventional extrusion machine, it is common to direct air in a known manner at low pressure into the interior of the extruded tube T. In accordance with this invention, air is preferably similarly introduced into the tube T at the time the tube is extruded at a pressure of approximately one pound per square inch which is entrapped in the portion P when the same is pinched off by the ends 10, 10 of the mold 6 in the manner heretofore described and illustrated in FIGURE 1. This entrapped air under pressure in the pinched off portion P supports the wall thereof against collapsing internally during the severing operation performed by the blade means 46 in the manner heretofore described. The tube T also has an external diameter which is slightly greater than the minimum internal diameter of the neck cavity 22, as is best illustrated in FIGURE 1 of the drawing. When the mold bodies 7 and 8 are closed, the interior surfaces (unnumbered) of the wall portions 20 and 21 grip and slightly constrict the central portion of the pinched off portion P in the manner shown in FIGURE 1, thereby additionally supporting the same in order to assure against the collapsing of the portion P during the severing operation.

In addition to supporting the pinched off portion P against collapsing during the severing thereof by the blade means 46, the mold bodies 7 and 8 are each provided with substantially identical semi-circular relieved portions 60 and 61 respectively at upper and lower portions of the respective recesses 51 and 52. As the blade means 46 severs the pinched off portion P into the upper and lower sections the plastic material is displaced by the main blade portion 48 into the recesses 60 and 61, as is clearly illustrated in FIGURE 2 of the drawing.

Modifications of the disclosed apparatus 5 as well as the method will be apparent to those skilled in the art after reading this disclosure, and such modifications are considered within the scope of this invention. For example, while the blade means 46 has been described as being preferably reciprocated by pressurized air in both directions of its movement, suitable spring means could be employed to return the blade 47 from the position shown in FIGURE 2 to the position shown in FIGURE 1 of the drawing. Such a spring could encompass the base portion 50 between the piston 42 and the wall (unnumbered) of the mold body 8. Compressed air would load the piston during the movement to the position shown in FIGURE 2, and upon release of the air pressure the spring would drive the piston 42 and the blade to the position shown in FIGURE 1. Irrespective of whether the blade means 46 is reciprocated by spring means, pneumatic means, or a combination of both, it is highly imperative to a successful operation of the apparatus 5 that any such means drive the piston 42 extremely rapidly between the positions of FIGURES 1 and 2 in order that a severing of the pinched off portion P of the tube T occurs without the collapsing thereof.

It is also within the scope of this invention to immediately withdraw the blade 46 from the position illustrated in FIGURE 2 to the position shown in FIGURE 1 after the containers C¹ and C² have been blown but before the same are completely set, and under some conditions, it is preferable to rapidly withdraw the blade means 46 immediately upon the blowing of the articles in the apparatus 5.

Although only preferred embodiments of the invention have been specifically illustrated and described herein, it is to be understood that other minor modifications may be made in the invention within the spirit and scope thereof as defined in the appended claims.

I claim:
1. Apparatus for making a hollow plastic article from a plastic tube comprising a mold, said mold defining a mold cavity adapted to receive a plastic tube when the mold is open, means for introducing the plastic tube into the mold, means for dividing said tube into at least a pair of tube sections, said dividing means being defined by blade means, means for moving said blade means rapidly through the tube thereby dividing the same into said tube sections, and means for introducing pressurized fluid through said blade means in axially opposite directions into tube sections at axially opposite sides of said blade means for expanding the same into contact with the mold cavity and form articles therefrom.

2. Apparatus for making a plurality of hollow separate plastic articles from sectioned portions of a plastic tube comprising a sectional mold having first and second article defining cavities joined by an intermediate cavity portion, means for introducing a tube of plastic material into both said cavities and into the intermediate cavity portion, means for axially separating the tube into at least two spaced sections after the sectional mold is closed, means for expanding both tube sections by introducing pressurized fluid into said spaced sections by a common means whereby said sections are expanded into contact with said cavities to form separate articles, said separating means including blade means, means for moving said blade means across said intermediate cavity portion to sever and thereby separate said tube, means in said intermediate cavity portion for accommodating tube material displaced during the severing of said tube, and said last-mentioned means being a relieved area of said intermediate cavity portion on opposite sides of said blade means.

3. The apparatus as defined in claim 1 including a fluid cylinder carried by said mold, said moving means including a piston mounted for reciprocal movement in said cylinder, means for selectively introducing fluid into said cylinder at opposite sides thereof to reciprocate said piston, and said blade means being connected to said piston for reciprocal movement therewith.

4. The apparatus as defined in claim 1 including a fluid cylinder carried by said mold, said moving means including a piston mounted for reciprocal movement in said cylinder, means for selectively introducing fluid into said cylinder at opposite sides thereof to reciprocate said piston, said blade means being connected to said piston for reciprocal movement therewith, and said fluid introducing means of said blade means being defined in part by passage means opening into said cylinder at a side of said piston adjacent which the fluid causes the blade means to move toward and through the tube.

5. The apparatus as defined in claim 1 wherein said fluid introducing means is defined by a passage in said blade means having an axis disposed generally normal to the tube axis, and said passage terminates at a pair of coaxial axially opposite opening ports whereby said passage and ports define common means for introducing the fluid into the tube sections for expanding the same into contact with the mold cavity.

6. The apparatus as defined in claim 3 wherein said fluid introducing means includes a passage in said blade means disposed generally normal to the tube axis and terminating at oppositely axially opening ports.

7. The apparatus as defined in claim 3 wherein said piston and blade means are coupled to each other by a piston rod, and said fluid introducing means includes a passage in said rod.

8. The apparatus as defined in claim 4 wherein said fluid introducing means includes a passage in said blade means disposed generally normal to the tube axis and terminating at oppositely axially opening ports.

9. The apparatus as defined in claim 4 wherein said piston and blade means are coupled to each other by a piston rod, and said fluid introducing means includes a passage in said rod.

References Cited

UNITED STATES PATENTS

| Re. 23,564 | 10/1952 | Hobson. | |
| 2,991,500 | 7/1961 | Hagen. | |
| 3,183,287 | 5/1965 | Fischer. | |
| 3,294,885 | 12/1966 | Cines et al. | 18—5 X |
| 3,300,556 | 1/1967 | Battenfeld et al. | 18—5 X |
| 3,303,243 | 2/1967 | Hughes et al. | 264—94 X |

FOREIGN PATENTS

| 1,172,419 | 10/1958 | France. |
| 39/3,581 | 4/1964 | Japan. |

WILBUR L. McBAY, Primary Examiner

U.S. Cl. X.R.

83—169; 264—94, 159